(12) United States Patent
Shapiro

(10) Patent No.: US 8,166,557 B1
(45) Date of Patent: Apr. 24, 2012

(54) METHOD AND APPARATUS FOR DYNAMICALLY PROVIDING PRIVACY-POLICY INFORMATION TO A USER

(75) Inventor: Bill Shapiro, Palo Alto, CA (US)

(73) Assignee: Abode Systems Incorporated, San Jose, CA (US)

( * ) Notice: Subject to any disclaimer, the term of this patent is extended or adjusted under 35 U.S.C. 154(b) by 1301 days.

(21) Appl. No.: 11/243,307

(22) Filed: Oct. 3, 2005

(51) Int. Cl.
*G06F 21/00* (2006.01)
(52) U.S. Cl. ........................................................ 726/27
(58) Field of Classification Search .................. 713/150, 713/155, 156, 168, 173, 175, 182, 183, 185
See application file for complete search history.

(56) References Cited

U.S. PATENT DOCUMENTS

| 5,765,152 | A  | 6/1998  | Erickson |
| 6,289,460 | B1 | 9/2001  | Hajmiragha |
| 6,301,660 | B1 | 10/2001 | Benson |
| 6,460,141 | B1 | 10/2002 | Olden |
| 6,885,999 | B1 | 4/2005  | Corless |
| 2002/0104015 | A1* | 8/2002 | Barzilai et al. ............... 713/201 |
| 2003/0084300 | A1* | 5/2003 | Koike ............................ 713/182 |
| 2006/0095956 | A1* | 5/2006 | Ashley et al. ..................... 726/4 |

OTHER PUBLICATIONS

"Configuring Internet Explorer for Practical Security and Privacy—Part 3", 2005, pp. 2-15, <http://www.malwarehelp.org/configuring-internet-explorer3.html>.*

* cited by examiner

*Primary Examiner* — Gilberto Barron, Jr.
*Assistant Examiner* — Simon Kanaan
(74) *Attorney, Agent, or Firm* — Robert C. Kowert; Meyertons, Hood, Kivlin, Kowert & Goetzel, P.C.

(57) ABSTRACT

One embodiment of the present invention provides a system that facilitates dynamically providing privacy-policy information to a user to facilitate compliance with privacy laws. The system operates by receiving a request from the user to access digital content at a client. Upon receiving a request, the system sends a notification to a server, including information about the request. Next, the system receives a response from the server at the client, wherein the response includes privacy-policy instructions. Alternatively, the response could include the entire privacy policy. The system then allows the user to access the digital content at the client in accordance with the privacy-policy instructions.

20 Claims, 3 Drawing Sheets

METHOD AND APPARATUS FOR DYNAMICALLY PROVIDING PRIVACY-POLICY INFORMATION TO A USER

BACKGROUND

1. Field of the Invention

The present invention relates to Rights Management Systems.

More specifically, the present invention relates to a method and an apparatus for dynamically providing privacy-policy information to a user.

2. Related Art

In recent years, online privacy has become an area of growing concern. As the ability to audit user actions has become more powerful in Rights Management Systems and other applications, new laws have emerged, both in the United States and internationally, that dictate what information may be captured, how it may be captured, whether the user must be warned that information is being captured, and, if so, how the user must be warned. For example, if a user opens digital content that is controlled by a Rights Management System, the user is typically not warned that his or her actions may be audited, even though law may require disclosure of such actions. A record of the fact that the user opened the digital content may be stored in an audit log on the server.

In order to comply with these above-mentioned laws, some applications provide blanket disclaimers that must be agreed to in order to use the application. Other applications include such statements in their End-User License Agreements (EULAs). However, these methods are often ineffective. In the first example, every user is presented with a blanket disclaimer whether or not it applies to the specific version of the application or digital content. In the second example, most users never take the time to read the EULA.

Moreover, local laws governing privacy and auditing vary widely in each jurisdiction. When a user accesses resources online, different laws can come into play based on the source of the digital content, as well as the user's current location. For example, a user opening a document located on a server in New York might be governed by different laws than a user opening a document located on a server in Berlin. In addition, a user opening a remote document from a client in Los Angeles might be governed by different laws than a user opening the same remote document from a client in Paris.

Hence, what is needed is a method and an apparatus for effectively dealing with various privacy and auditing laws without the problems listed above.

SUMMARY

One embodiment of the present invention provides a system that facilitates dynamically providing privacy-policy information to a user to facilitate compliance with privacy laws. The system operates by receiving a request from the user to access digital content at a client. Upon receiving a request, the system sends a notification to a server, including information about the request. Next, the system receives a response from the server at the client, wherein the response includes privacy-policy instructions. Alternatively, the response could include the entire privacy policy. The system then allows the user to access the digital content at the client in accordance with the privacy-policy instructions.

In a variation of this embodiment, allowing the user to access the digital content involves requesting permission from the user to audit the user's actions. The system then receives a response from the user and opens the digital content. If the user has agreed to the audit, the system audits the user's actions. However, if the user has not agreed to the audit, the system does not audit the user's actions.

In a variation of this embodiment, allowing the user to access the digital content involves requesting permission from the user to audit the user's actions. The system then receives a response from the user. If the user has agreed to the audit, the system opens the digital content at the client and audits the user's actions. However, if the user has not agreed to the audit, the system prevents the digital content from being opened at the client.

In a variation of this embodiment, the system stores a cache of the privacy-policy instructions on the client, wherein the cache of the privacy-policy instructions may be stored within the digital content, or separate from the digital content.

In a further variation, if the server is unreachable, the system receives privacy-policy instructions from the cache of the privacy-policy instructions within the digital content instead of from the server.

In a variation of this embodiment, the notification includes an identifier for the digital content. The system uses this identifier at the server to determine content-specific privacy-policy instructions. The system then allows the user to access the digital content at the client in accordance with the content-specific privacy-policy instructions.

In a variation of this embodiment, the system receives a request from the user, at the server, to modify the privacy policy. In response to the request, the system allows the user to modify the privacy policy.

In a further variation, the request to modify the policy is received from a web browser.

DETAILED DESCRIPTION

Figure 1:
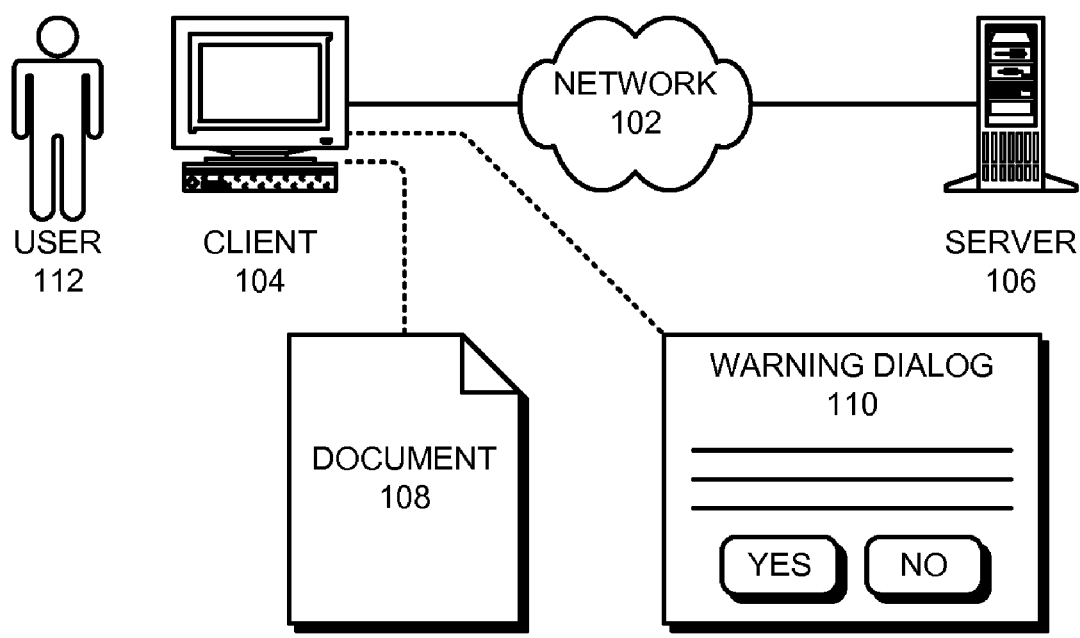
FIG. 1 illustrates a system that facilitates a server-configurable privacy warning dialog in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system.

This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

BACKGROUND

The problem to be solved is to allow a client-based application to warn a user that by opening and performing other actions on content (such as printing it) that their actions may be recorded and viewed by others. This should ideally be done so that a Right's Management System can be configured to be consistent with local, national, and international privacy laws. Additionally, the same client application should ideally be usable on content originating from different sources, which may have different privacy requirements.

For example, a user may open a Rights Managed document that is managed against the company's Rights Management server. This server may only be used to support internal employees, and therefore, the company may not be required to warn the user that their actions may be audited. However, a user may open another document that came from an outside source (for example, a commercial site that sells research reports) with the same viewer application. In this case, the research report company may want to warn the user that their actions may be tracked (or may be required to do so by law).

One embodiment of the present invention allows an organization that distributes Right's Managed content to centrally specify whether the viewer application(s) for that content should show a privacy warning dialog and what type of semantics should be associated with the dialog. For example, the dialog may allow the user to choose whether to be audited, but will open the document regardless of which answer they choose (only auditing if the user agrees to it). The dialog may also warn the user that if they do choose to open the document, their actions will be audited and the application will refuse to open the document if the user does not agree to be audited. The embodiment also allows the privacy settings to be specified based on where the content came from, so that content from different sources may carry different privacy warnings.

Server-Configurable Privacy-Warning Dialog

FIG. 1 illustrates a system that facilitates a server-configurable privacy-warning dialog in accordance with an embodiment of the present invention. FIG. 1 includes network 102. Network 102 can generally include any type of wired or wireless communication channel capable of coupling together computing nodes. This includes, but is not limited to, a local area network, a wide area network, or a combination of networks. In one embodiment of the present invention, network 102 includes the Internet.

Client 104 and server 106 are coupled to network 102. Client 102 can generally include any type of computer system, including, but not limited to, a computer system based on a microprocessor, a mainframe computer, a digital signal processor, a portable computing device, a personal organizer, a device controller, and a computational engine within an appliance. In addition, client 102 can generally include any node on a network including computational capability and including a mechanism for communicating across the network. Server 106 can generally include any computational node including a mechanism for servicing requests from a client for computational and/or data storage resources.

When user 112 requests to open document 108 at client 104, client 104 sends a request to server 106 requesting the privacy settings for document 108. Note that these settings can be document specific, user specific, location specific, or any combination thereof. Also note that document 108 could also be any other form of digital content, such as a picture, an audio file, or a video file. Upon receiving the privacy settings from server 106, server 104 controls the access and auditing of document 108 based on the privacy settings. This may include displaying warning dialog 110 to user 112 and waiting for a confirmation from user 112 before proceeding. These actions are described in more detail in the following description of FIG. 2.

Process of Implementing a Server-Configurable Privacy-Warning

Figure 2:
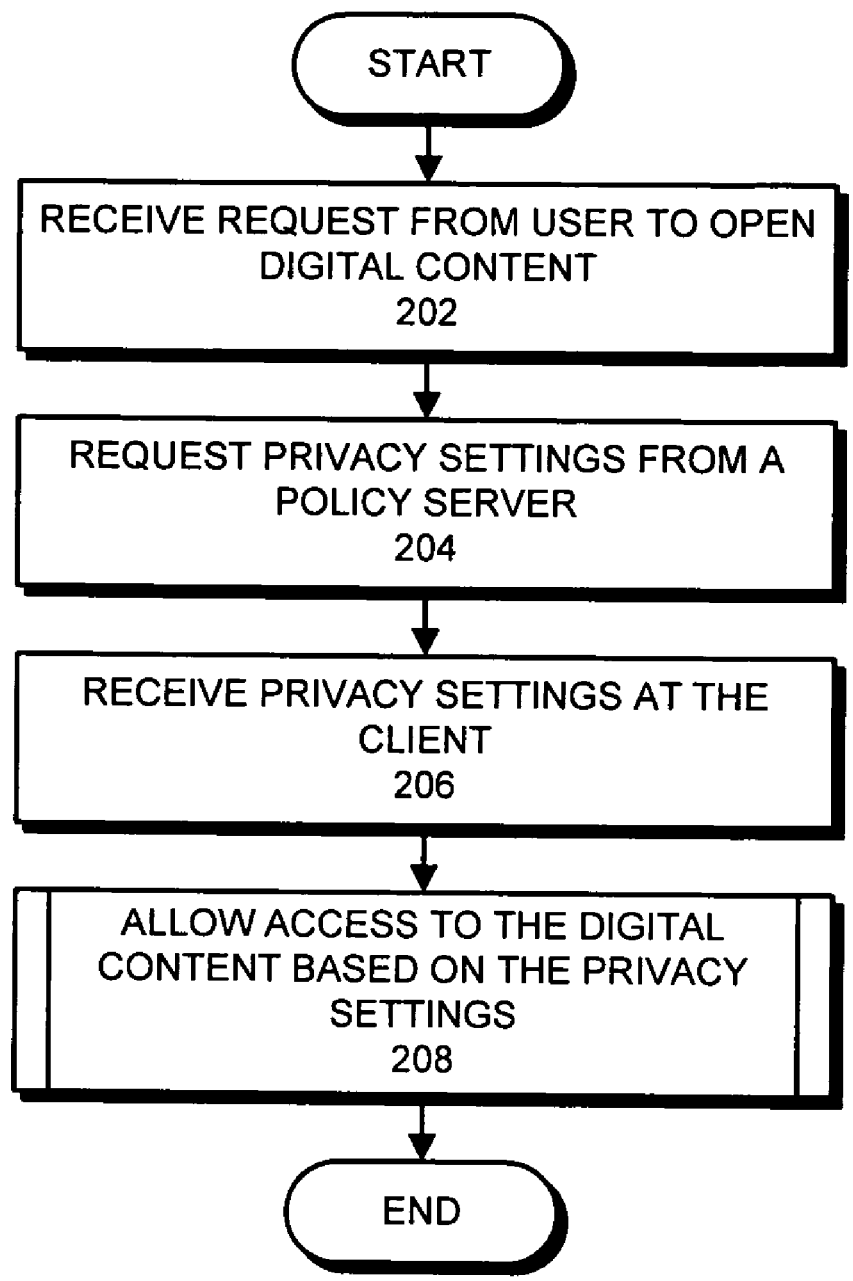
FIG. 2 presents a flowchart illustrating the process of providing a server-configurable privacy-warning dialog in accordance with an embodiment of the present invention.

FIG. 2 presents a flowchart illustrating the process of providing a server-configurable privacy-warning in accordance with an embodiment of the present invention. The system starts by receiving a request from a user 112 to open digital content, such as document 108, at client 104 (step 202). In response to this request, client 104 requests the privacy settings from server 106 (step 204). As mentioned in the previous section, these privacy settings can be document-specific, user-specific, location-specific (which can include the current location of client 104 or the source of document 108), or any combination thereof. In addition, these settings can be stored in a Database Management System, a configuration file, or any other form of persistent storage.

Next, client 104 receives the privacy settings from server 106 (step 206). In one embodiment of the present invention, a copy of the privacy settings is cached in the digital content to facilitate compliance with privacy policies when server 106 is unreachable. Alternatively, a copy of the privacy settings could be cached on the client separate from the digital content. This is especially useful when client 104 does not have a network connection (which is common for mobile clients) or when network 102 (or server 106) is down.

In another embodiment of the present invention, default policies can be enforced in the absence of policy information. For example, client 104 can present user 112 with a default option, or can refuse to open document 108 until such a time when a privacy policy can be obtained from server 106.

Upon receiving the privacy settings, client 104 allows access to the digital content (document 108) based on the privacy settings (step 208). This step is described in more detail in the following section with reference to FIG. 3. In one embodiment of the present invention, steps 204 and 206 are transparent to user 112.

Allowing Access to Digital Content Based on Privacy Settings

Figure 3:
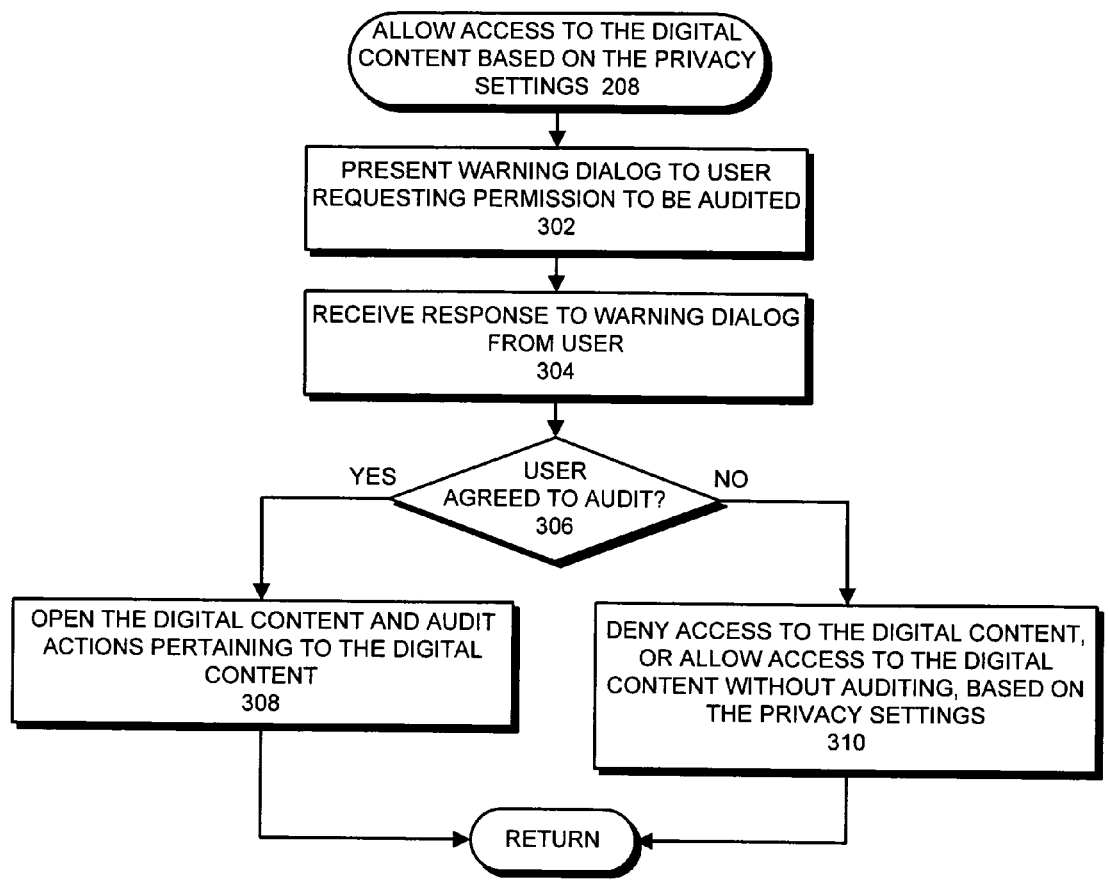
FIG. 3 presents a flowchart illustrating the process of allowing access to digital content based on privacy settings in accordance with an embodiment of the present invention.

FIG. 3 presents a flowchart illustrating the process of allowing access to digital content based on privacy settings in accordance with an embodiment of the present invention. The system operates by presenting user 112 with warning dialog 110 requesting permission to audit the actions of user 112 as they relate to the digital content (step 302). Note that the content of warning dialog 110 may be specified on server 106. Additionally, this content may include the text strings to be displayed and a Universal Resource Locator (URL) that user 112 may go to for more information. Upon receiving a response from user 112 (step 304), the system determines if user 106 agreed to be audited (step 306). If so, the system opens the digital content and audits the actions of user 112 as they pertain to the digital content (step 308).

If user 112 does not agree to be audited, the system can either deny access to the digital content outright, or open the digital content without auditing any actions of user 112 (step 310). These options depend on the privacy settings retrieved from server 106. A third option involves skipping steps 302-310, and auditing user 112 without notification if the policy dictates such.

In one embodiment of the present invention, administrators can modify the privacy settings on server 106 via a web interface.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for providing privacy-policy information to a user to facilitate compliance with privacy laws, the method comprising:
   using a client computer to perform:
      receiving, by a client-based application executing on the client computer, a request from the user to access digital content via the client-based application,
         wherein at a time the request is received, the digital content is stored on the client computer and the user is not yet allowed to access the digital content;
      sending, by the client-based application, a notification to a server, wherein the notification comprises information about the request;
      receiving, by the client-based application, a response from the server, wherein the response comprises privacy-policy instructions,
         wherein the privacy-policy instructions specify conditions for accessing the digital content stored on the client computer, and
         wherein the privacy-policy instructions indicate whether a privacy warning dialog should be displayed to the user;
      determining, by the client-based application, whether to display the privacy warning dialog dependent on the privacy-policy instructions;
      in response to determining that the privacy warning dialog should be displayed, displaying, by the client-based application, the privacy warning dialog; and
      allowing, by the client-based application, the user to access the digital content stored on the client computer via the client-based application,
         wherein said allowing is dependent on whether the conditions for accessing the digital content are satisfied.

2. The method of claim 1, wherein allowing the user to access the digital content further comprises:
   using the privacy warning dialog to:
      request permission from the user to perform an audit of the user's actions; and
      receive a response from the user indicating whether the user has provided permission for the audit;
   opening the digital content; and
   in response to the user providing permission for an audit, auditing the user's actions.

3. The method of claim 1, wherein the conditions for accessing the digital content specify an audit of the user's actions, and wherein allowing the user to access the digital content further comprises:
   using the privacy warning dialog to:
      request permission from the user to perform the audit of the user's actions; and
      receive a response from the user indicating whether the user has provided permission for the audit;
   in response to the user providing permission for the audit, opening the digital content and auditing the user's actions; and
   in response to the user not providing permission for the audit, preventing the digital content from being opened.

4. The method of claim 1, further comprising storing a cache of the privacy-policy instructions on the client, wherein the cache of the privacy-policy instructions is stored within the digital content, or separate from the digital content.

5. The method of claim 4, wherein if the server is unreachable, the method further involves receiving privacy-policy instructions from the cache of the privacy-policy instructions instead of from the server.

6. The method of claim 1, wherein the notification includes an identifier for the digital content, and wherein the method further comprises:
   using the identifier for the digital content at the server to determine content-specific privacy-policy instructions, wherein the content-specific privacy-policy instructions specify content-specific conditions for accessing the digital content;
   allowing the user to access the digital content at the client, wherein said allowing is dependent on the content-specific conditions for accessing the digital content being satisfied.

7. The method of claim 1, further comprising:
   receiving a request from the user, at the server, to modify the privacy-policy instructions; and
   in response to the request, allowing the user to modify the privacy-policy instructions.

8. The method of claim 7, wherein the request to modify the privacy-policy instructions is received from a web browser.

9. A non-transitory computer-readable storage device storing instructions that when executed by a client computer cause the computer to perform a method for providing privacy-policy information to a user to facilitate compliance with privacy laws, the method comprising:
   receiving, by a client-based application executing on the client computer, a request from a user to access digital content via the client-based application,
      wherein at a time the request is received, the digital content is stored on the client computer and the user is not yet allowed to access the digital content;
   sending, by the client-based application, a notification to a server, wherein the notification comprises information about the request;
   receiving, by the client-based application, a response from the server, wherein the response includes privacy-policy instructions,
      wherein the privacy-policy instructions specify conditions for accessing the digital content stored on the client computer, and
      wherein the privacy-policy instructions indicate whether a privacy warning dialog should be displayed to the user;
   determining, by the client-based application, whether to display the privacy warning dialog dependent on the privacy-policy instructions;
   in response to determining that the privacy warning dialog should be displayed, displaying, by the client-based application, the privacy warning dialog; and
   allowing, by the client-based application, the user to access the digital content stored on the client computer via the client-based application,
      wherein said allowing is dependent on whether the conditions for accessing the digital content are satisfied.

10. The non-transitory computer-readable storage device of claim 9, wherein allowing the user to access the digital content further comprises:
   using the privacy warning dialog to:
      request permission from the user to perform an audit of the user's actions; and
      receive a response from the user indicating whether the user has provided permission for the audit;
   opening the digital content; and
   in response to the user providing permission for the audit, auditing the user's actions.

11. The non-transitory computer-readable storage device of claim 9, wherein the conditions for accessing the digital content specify an audit of the user's actions, and wherein allowing the user to access the digital content further comprises:
   using the privacy warning dialog to:
      request permission from the user to perform the audit of the user's actions; and
      receive a response from the user indicating whether the user has provided permission for the audit;
   in response to the user providing permission for the audit, opening the digital content and auditing the user's actions; and
   in response to the user not providing permission for the audit, preventing the digital content from being opened.

12. The non-transitory computer-readable storage device of claim 9, wherein the method further comprises storing a cache of the privacy-policy instructions on the client, wherein the cache of the privacy-policy instructions is stored within the digital content, or separate from the digital content.

13. The non-transitory computer-readable storage device of claim 12, wherein if the server is unreachable, the method further involves receiving privacy-policy instructions from the cache of the privacy-policy instructions instead of from the server.

14. The non-transitory computer-readable storage device of claim 9, wherein the notification includes an identifier for the digital content, and wherein the method further comprises:
   using the identifier for the digital content at the server to determine content-specific privacy-policy instructions, wherein the content-specific privacy-policy instructions specify content-specific conditions for accessing the digital content;
   allowing the user to access the digital content at the client, wherein said allowing is dependent on the content-specific conditions for accessing the digital content being satisfied.

15. The non-transitory computer-readable storage device of claim 9, wherein the method further comprises:
   receiving a request from the user, at the server, to modify the privacy-policy instructions; and
   in response to the request, allowing the user to modify the privacy-policy instructions.

16. The non-transitory computer-readable storage device of claim 15, wherein the request to modify the privacy-policy instructions is received from a web browser.

17. An apparatus that provides privacy-policy information to a user to facilitate compliance with privacy laws, the apparatus comprising:
   a receiving mechanism of a client-based application executing on a client computer configured to receive a request from the user to access digital content via the client-based application,
      wherein at a time the request is received, the digital content is stored on the client computer and the user is not yet allowed to access the digital content;
   a sending mechanism of the client-based application configured to send a notification to a server,
      wherein the notification comprises information about the request;
   wherein the receiving mechanism of the client-based application is additionally configured to receive a response from the server,
   wherein the response comprises privacy-policy instructions, wherein the privacy-policy instructions specify conditions for accessing the digital content stored on the client computer, and
   wherein the privacy-policy instructions indicate whether a privacy warning dialog should be displayed to the user; and
   an access mechanism of the client-based application configured to:
      determine whether to display the privacy warning dialog dependent on the privacy-policy instructions;
      in response to determining that the privacy warning dialog should be displayed, displaying, by the client-based application, the privacy warning dialog; and
      allow the user to access the digital content stored on the client computer via the client-based application,
         wherein said allowing is dependent on whether the conditions for accessing the digital content are satisfied.

18. The apparatus of claim 17, wherein the access mechanism is further configured to:
   use the privacy warning dialog to:
      request permission from the user to perform an audit of the user's actions; and
      receive a response from the user indicating whether the user has provided permission for the audit;
   open the digital content; and
   in response to the user providing permission for the audit, audit the user's actions.

19. The apparatus of claim 17, wherein the conditions for accessing the digital content specify an audit of the user's actions, and wherein the access mechanism is further configured to:
   use the privacy warning dialog to:
      request permission from the user to perform the audit of the user's actions; and
      receive a response from the user indicating whether the user has provided permission for the audit;
   in response to the user providing permission for the audit, open the digital content and audit the user's actions; and
   in response to the user not providing permission for the audit, prevent the digital content from being opened.

20. The apparatus of claim 17, further comprising a caching mechanism configured to store a cache of the privacy-policy instructions on the client, wherein the cache of the privacy-policy instructions is stored within the digital content, or separate from the digital content.

* * * * *